US011575725B2

(12) United States Patent
Huang et al.

(10) Patent No.: US 11,575,725 B2
(45) Date of Patent: Feb. 7, 2023

(54) CONTENT DELIVERY NETWORK STREAMING OPTIMIZATION

(71) Applicant: Verizon Patent and Licensing Inc., Arlington, VA (US)

(72) Inventors: Jian Huang, Sudbury, MA (US); Gong Zhang, Waltham, MA (US); Susan Kelly, Maynard, MA (US); Harshal Khandare, Waltham, MA (US); Guanrao Chen, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 886 days.

(21) Appl. No.: 14/982,616

(22) Filed: Dec. 29, 2015

(65) Prior Publication Data

US 2017/0187768 A1    Jun. 29, 2017

(51) Int. Cl.
*H04L 65/612*     (2022.01)
*H04L 65/80*      (2022.01)
*H04L 67/02*      (2022.01)
*H04L 67/1021*    (2022.01)
*H04L 67/63*      (2022.01)
*H04L 67/568*     (2022.01)

(52) U.S. Cl.
CPC ............ *H04L 65/612* (2022.05); *H04L 65/80* (2013.01); *H04L 67/02* (2013.01); *H04L 67/1021* (2013.01); *H04L 67/568* (2022.05); *H04L 67/63* (2022.05)

(58) Field of Classification Search
CPC ...... H04L 65/4084; H04L 65/80; H04L 67/18

USPC ......................................................... 709/219
See application file for complete search history.

(56) References Cited

U.S. PATENT DOCUMENTS

| 8,489,923 B1* | 7/2013 | Lakshminarayanan ...................... H04N 21/2662 714/26 |
| 2013/0013730 A1* | 1/2013 | Li ........................... H04L 65/80 709/217 |
| 2014/0108671 A1* | 4/2014 | Watson ............... H04L 65/4084 709/231 |
| 2014/0164584 A1* | 6/2014 | Joe ..................... H04L 61/1511 709/223 |
| 2016/0065662 A1* | 3/2016 | Yellin ................. H04L 67/1008 709/203 |
| 2017/0366595 A1* | 12/2017 | Feher .................. H04L 12/6418 |

* cited by examiner

*Primary Examiner* — Kevin S Mai

(57) ABSTRACT

A device may receive information associated with media content that is capable of being provided by a first content delivery network and a second content delivery network. The first content delivery network may include a first host device and a second host device. The device may determine scores associated with the first content delivery network and the second content delivery network. The device may provide, based on the scores, information regarding the first content delivery to a user device to cause the user device to request the media content from the first content delivery network. The device may determine scores associated with the first host device and the second host device. The device may provide information regarding the first host device to a network device to cause the network device to route requests for the media content to the first host device.

20 Claims, 9 Drawing Sheets

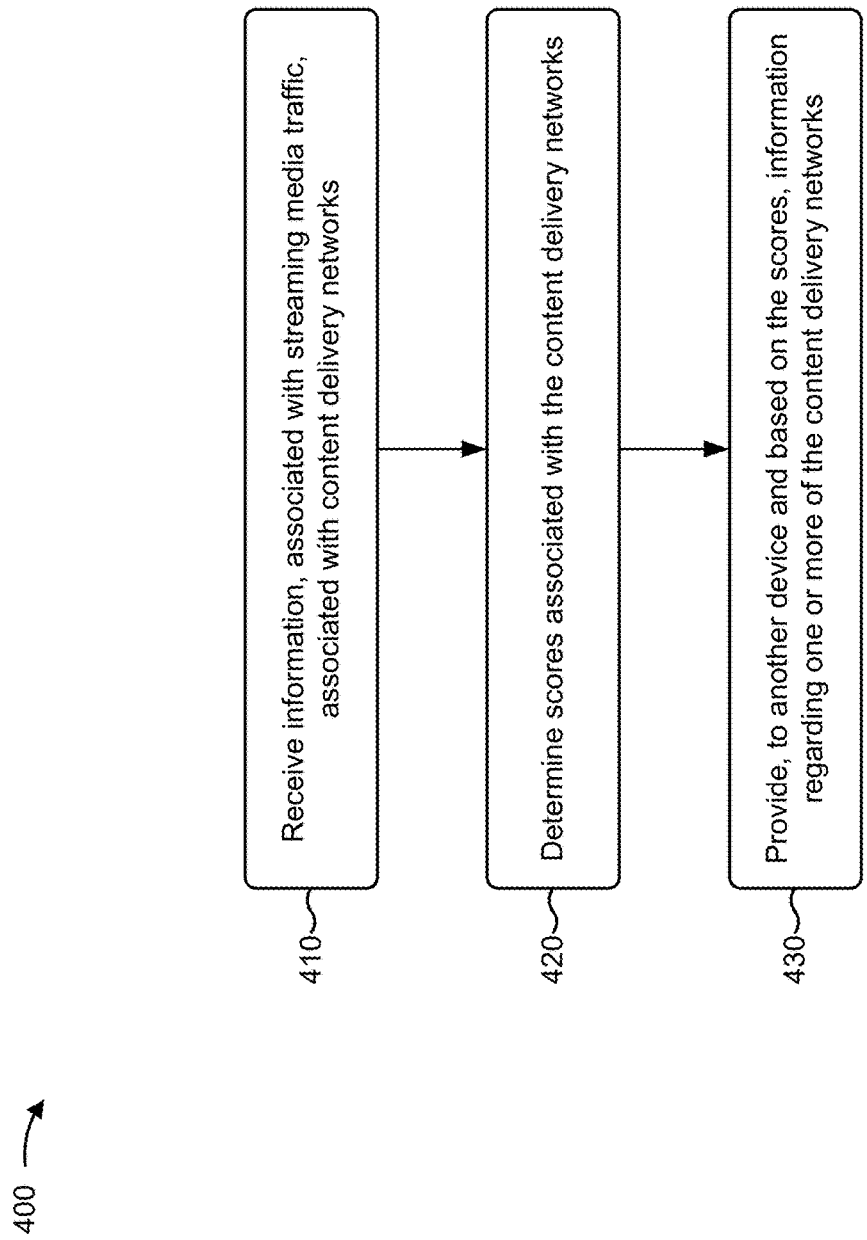

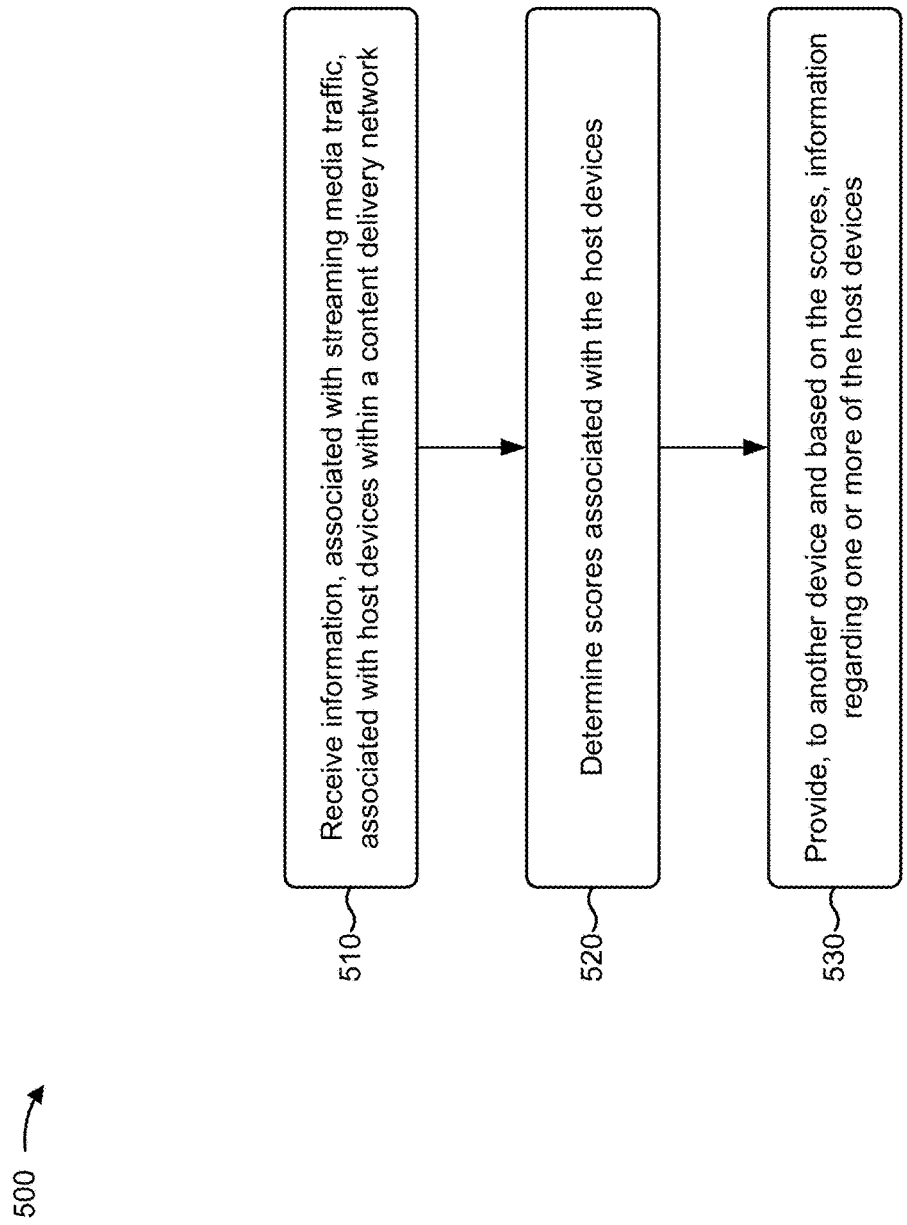

CONTENT DELIVERY NETWORK STREAMING OPTIMIZATION

BACKGROUND

A content delivery network (CDN) is a system of distributed servers that delivers content (e.g., streaming media (audio or video), webpages, etc.) to a user device based on a geographic location of the user device, a content delivery server, and/or an origin of the content. A CDN may decrease latency by providing, to a user device, content using a content delivery server that is nearest to the user device.

BRIEF DESCRIPTION OF THE DRAWINGS

FIG. 4 is a flow chart of an example process for determining scores associated with content delivery networks; and FIG. 5 is a flow chart of an example process for determining scores associated with host devices within a content delivery network.

DETAILED DESCRIPTION OF PREFERRED EMBODIMENTS

Figure 1A:
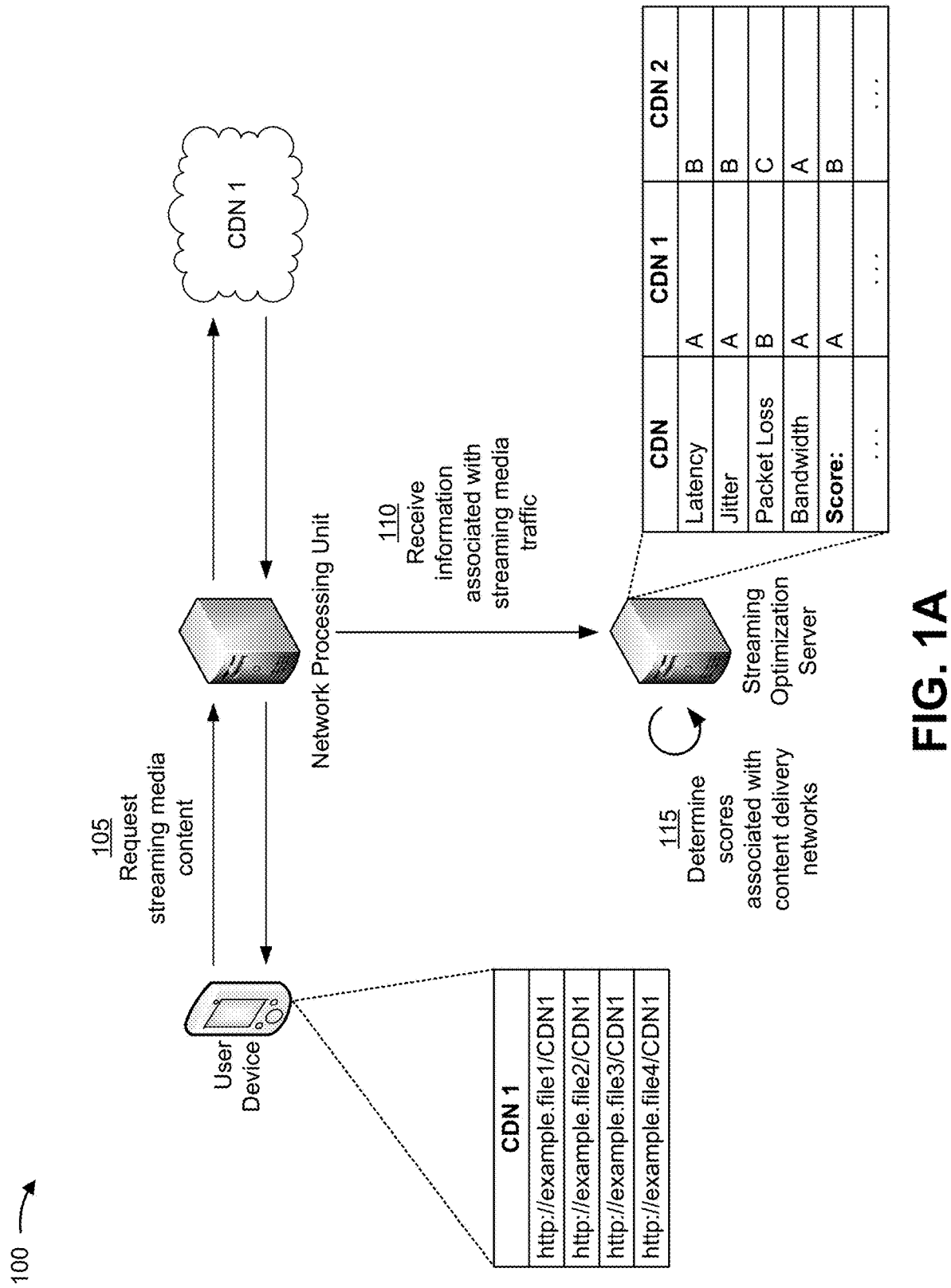
FIGS. 1A-1E are diagrams of an overview of an example implementation described herein.

The following detailed description of example implementations refers to the accompanying drawings. The same reference numbers in different drawings may identify the same or similar elements.

A user device may request streaming media content (e.g., live video, video on demand, audio, or the like) from a content provider device (e.g., a server). For example, the user device may receive (e.g., from a content provider device) a manifest file that includes multiple resource identifiers (e.g., uniform resource identifiers (URIs), uniform resource locators (URLs), or the like) that may allow the user device to access the streaming media content. The user device may request a segment of the streaming media content using a request (e.g., a hypertext transfer protocol (HTTP) request (e.g., an HTTP GET request), or the like).

The streaming media content may be hosted on multiple content delivery networks (CDNs) and/or by multiple host devices (e.g., servers) to reduce latency and/or allow flexibility with changing network conditions. Each CDN and/or host device may have some or all of the segments of media content for the streaming media content, and the segments may be associated with different resource identifiers that identify a different location on a network (e.g., a particular host device, a particular CDN, etc.).

In some cases, the user device may obtain streaming media content from a CDN and/or a host device that is located nearest to the user device (e.g., having a geographic location that is closest to the user device). However, another CDN and/or another host device, that are not located nearest to the user device, may be able to provide the streaming media content to the user device at a reduced latency, at a reduced packet loss rate, or the like. Additionally, a user device may request streaming media content from a CDN and/or a host device based on a network condition estimation. For example, the user device, CDN, and/or host device may estimate a network condition based on an overall delay (e.g., end-to-end) for traffic between the user device, CDN, and/or host device. However, in some cases, radio access network (RAN) conditions (e.g., associated with the user device communicating with a base station) may impact the overall delay and/or may inaccurately reflect a condition of a network (e.g., a congestion of the network).

Additionally, in some cases, the user device may obtain (e.g., continue to obtain) streaming media content from a particular CDN despite another CDN being capable of providing the streaming media content to the user device at a reduced latency, a reduced packet loss rate, or the like. Additionally, a particular CDN may not have information regarding another CDN (e.g., information identifying network congestion associated with another CDN). Additionally, a user device may move from a first geographic location to a second geographic location, which may affect the performance of a CDN and/or host device in delivering the streaming media content to the user device.

Implementations described herein may assist a user device in obtaining streaming media content from a CDN and/or a host device that are capable of providing the streaming media content to the user device at a reduced latency, at a reduced packet loss rate, etc. (e.g., as compared to another CDN and/or host device, which may be located closer to the user device). For example, a network device may monitor network traffic associated with the streaming media content and may determine scores associated with CDNs and/or host devices that are providing the streaming media content to user devices. In this way, network resources may be conserved by assisting user devices in obtaining streaming media content from particular CDNs and/or host devices that are providing the streaming media content at reduced latencies, reduced packet loss rates, etc.

FIGS. 1A-1E are diagrams of an overview of an example implementation 100 described herein. As shown in FIG. 1A, and by reference number 105, a user device may request streaming media content (e.g., live video, video on demand, audio, or the like) using one or more resource identifiers (e.g., URLs). For example, assume that user device 205 has a file (e.g., a manifest file) including multiple resource identifiers associated with multiple segments of the streaming media content. The user device may receive streaming media content via a content delivery network (e.g., CDN 1) based on using resource identifiers associated with the content delivery network (e.g., associated with CDN 1).

As shown by reference number 110, a streaming optimization server may receive, from a network processing unit, information associated with streaming media traffic. For example, the network processing unit may monitor streaming media traffic (e.g., associated with multiple content delivery networks and multiple user devices) and may measure performance metrics associated with the multiple content delivery networks (e.g., latency values, jitter values, packet loss values, bandwidth values, throughput values, etc.). The streaming optimization server may receive information identifying the performance metrics and may store the information in a performance table (e.g., a data structure). For example, CDN 1 and CDN 2 may be providing streaming media content.

In some implementations, the streaming optimization server may include a performance table for one or more geographic locations (e.g., latitude and longitude coordinates, a city, a location of a particular base station, etc.). Further, the performance metrics (e.g., received from the network processing unit) may correspond to a particular geographic location (e.g., may correspond to a CDN's performance in delivering streaming media content to the geographic location).

For example, as shown by reference number 115, the streaming optimization server may determine scores associated with content delivery networks based on one or more performance metrics (e.g., stored in the performance table). For example, a score may include a value, a rank, a status, or the like. For example, assume that a value "A" is better than a value "B" (e.g., a latency value of "A" is lower than a latency value of "B," etc.). In some implementations, the streaming optimization server may determine the score based on using a technique (e.g., an algorithm, machine learning, computational statistics, or the like).

Figure 1B:
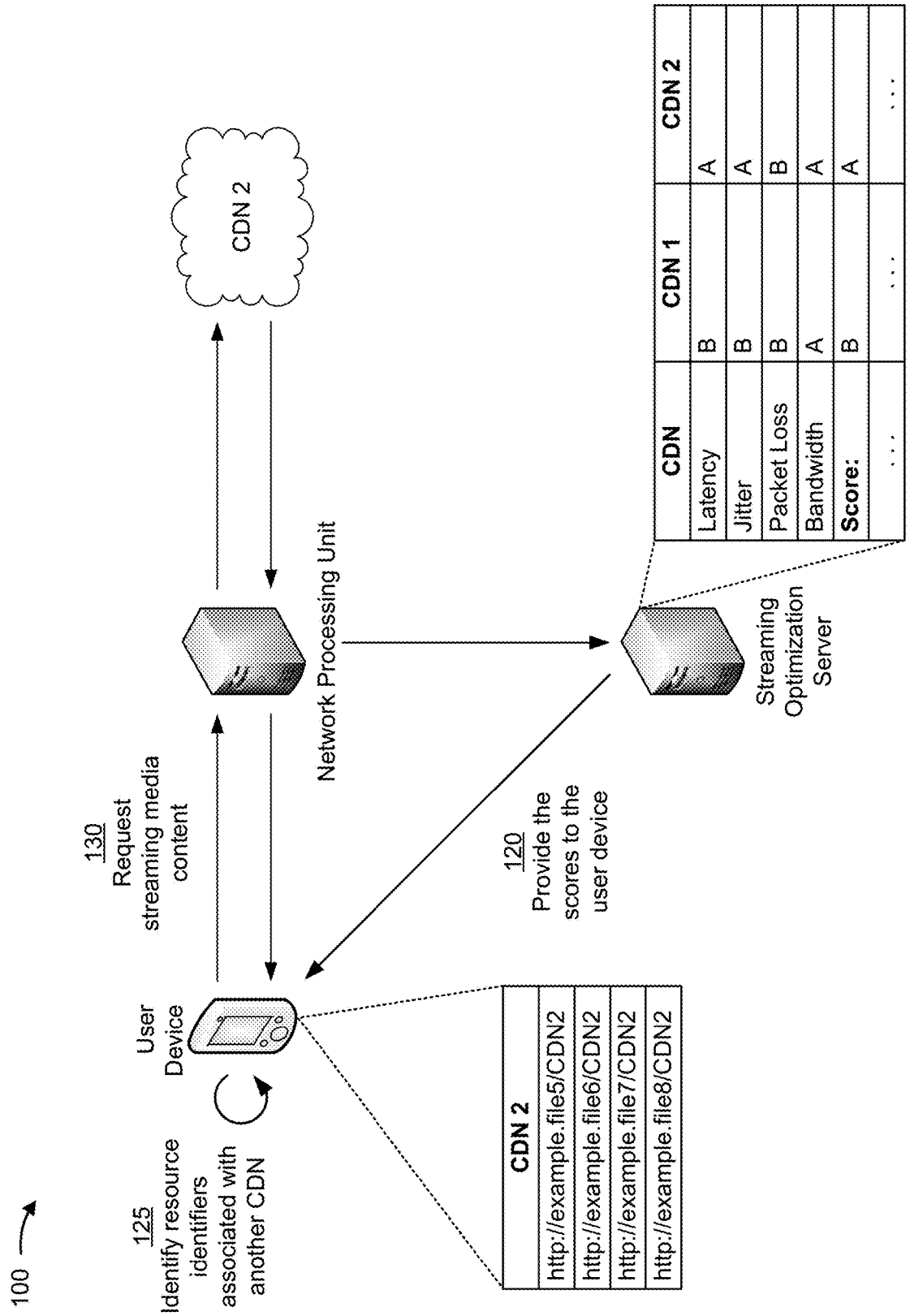

As shown in FIG. 1B, and by reference number 120, the streaming optimization server may provide, based on the scores, information regarding one or more CDNs to the user device. For example, the streaming optimization server may provide, to the user device, a message (e.g., a push notification) that includes information identifying the scores associated with the CDNs. In some implementations, the message may cause the user device to request the streaming media content from another CDN (e.g., a CDN that is different than a CDN from which the user device is receiving the streaming media content).

In some implementations, the message may cause the user device to request the streaming media content from another CDN based on the other CDN including a particular score. For example, assume that CDN 2 includes a score of "A," whereas CDN 1 includes a score of "B" (e.g., indicating that CDN 2 may provide the streaming media content at a reduced latency, at a reduced packet loss rate, etc. as compared to CDN 1).

As shown by reference number 125, the user device may identify resource identifiers associated with another CDN (e.g., CDN 2). For example, the user device may identify the resource identifiers in the manifest file, may request another manifest file that includes the resource identifiers, or the like. As shown by reference number 130, the user device may request streaming media content using resource identifiers associated with CDN 2. In this way, the user device may receive the streaming media content from a particular CDN (e.g., CDN 2) that includes a particular score (e.g., a score that is higher (e.g., indicating better performance) than another CDN (e.g., CDN 1).

Figure 1C:
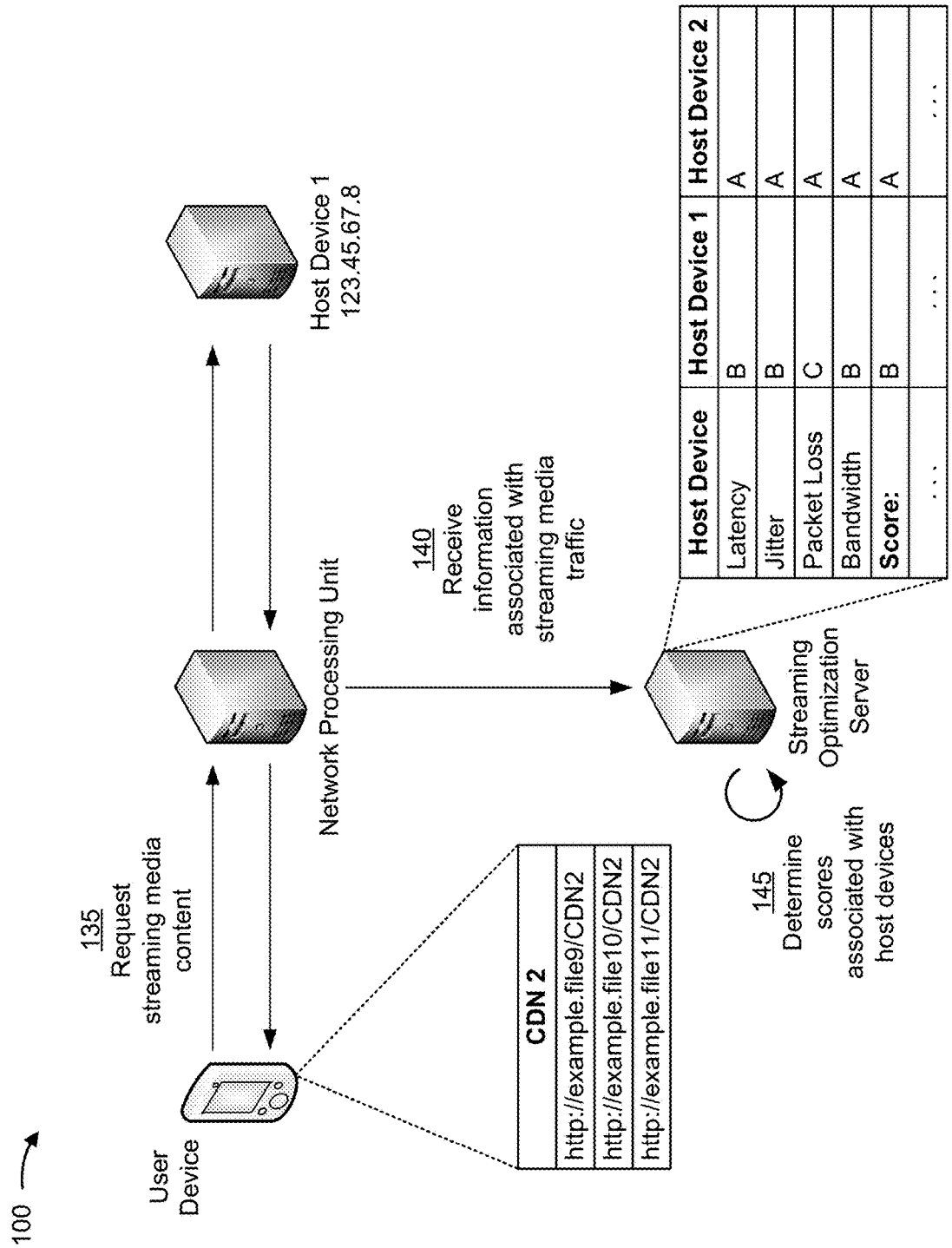

As shown in FIG. 1C, and by reference number 135, the user device may request streaming content using resource identifiers associated with CDN 2. For example, assume that a domain name server resolves a host name in the resource identifiers to a network address (e.g., an internet protocol (IP) address) associated with a particular host device (e.g., Host Device 1). Host Device 1 may receive the request and may provide the user device with the streaming media content.

As shown by reference number 140, the streaming optimization server may receive information, associated with streaming media traffic, associated with host devices within a particular CDN (e.g., CDN 2). For example, the streaming optimization server may receive performance metrics from the network processing unit, and may store values associated with the performance metrics in a performance table (e.g., in a similar fashion as described above in connection with CDNs).

As shown by reference number 145, the streaming optimization server may determine scores associated with the host devices. For example, the streaming optimization server may determine scores associated with the host devices in a similar manner as described above in connection with determining scores for CDNs. For example, assume that the streaming optimization server determines that a score associated with Host Device 2 is higher than a score associated with Host Device 1 (e.g., indicating that Host Device 2 is capable of delivering the streaming media content at a lower latency, a reduced packet loss rate, etc. than Host Device 1).

Figure 1D:
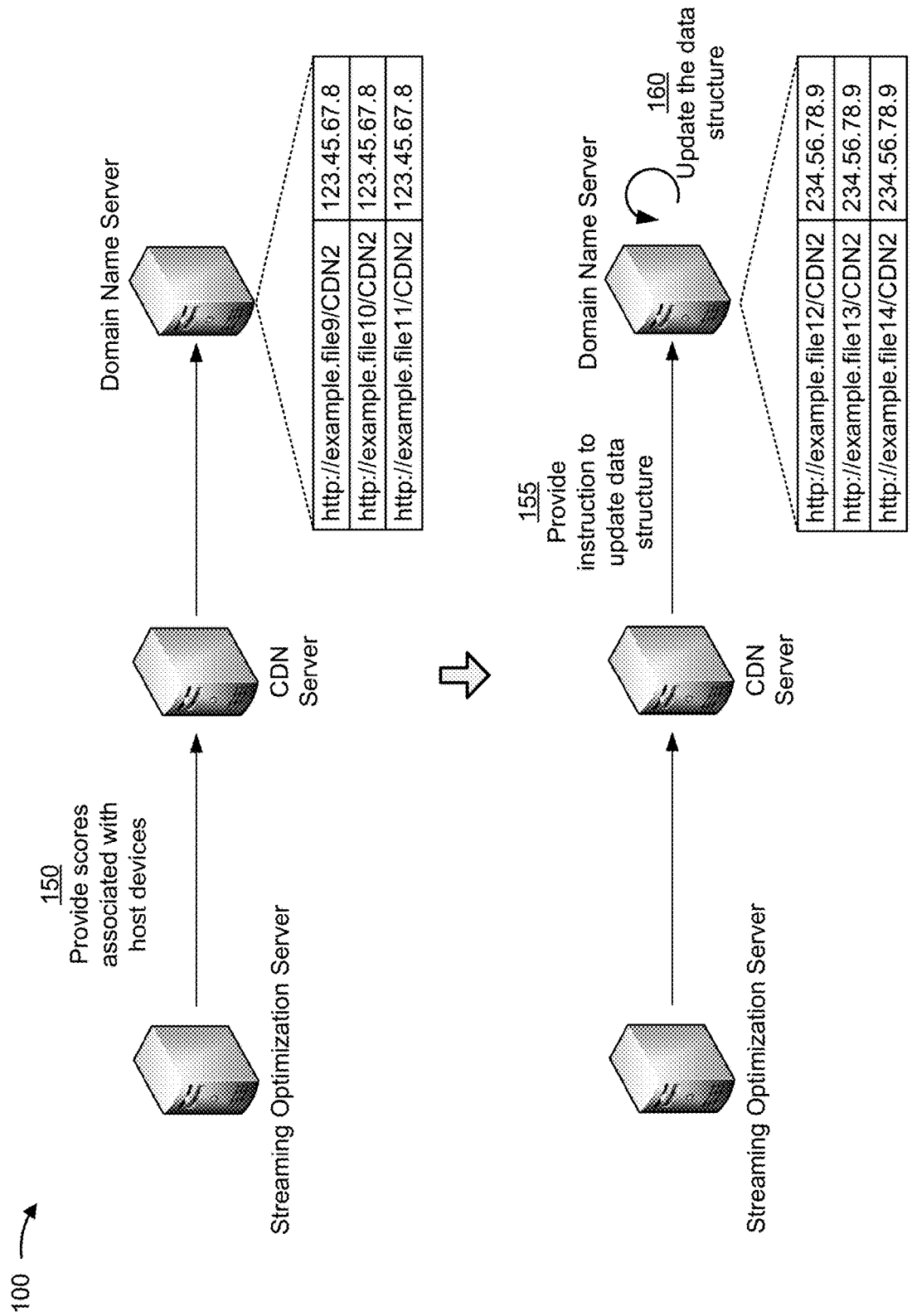

As shown in FIG. 1D, and by reference number 150, the streaming optimization server may provide, based on the scores, information regarding one or more host devices to a CDN server (e.g., a CDN server associated with CDN 2). For example, the streaming optimization server may provide, to the CDN server, a message (e.g., a push notification) that includes information identifying the scores associated with the host devices. For example, assume that a domain name server includes a data structure (e.g., a lookup table, etc.) that maps host names to a network address (e.g., an IP address) associated with a particular host device. The domain name server may resolve a host name (included in a resource identifier provided by the user device) to a network address associated with a host device.

As shown by reference number 155, the CDN server may instruct the domain name server to update the data structure (e.g., map host names to a different network address) based on receiving the message from the streaming optimization server. As shown by reference number 160, the domain name server may update the data structure. For example, the domain name sever may map host names to a network address associated with a different host device (e.g., Host Device 2).

Figure 1E:
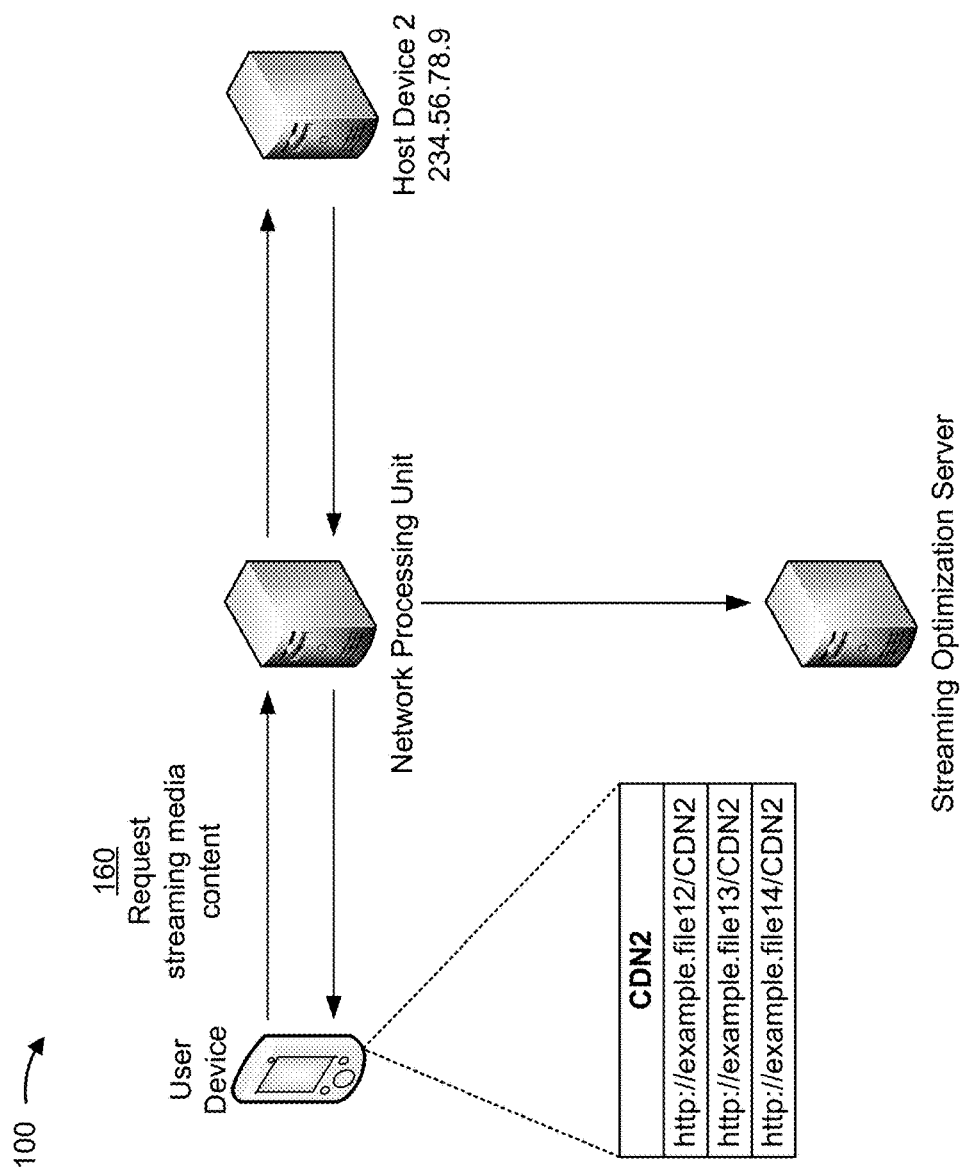

As shown in FIG. 1E, and by reference number 160, the user device may request streaming media content. Based on the domain name server updating the data structure, the domain name server may resolve host names to a network address associated with Host Device 2 (e.g., "234.56.78.9"). In this way, Host Device 2 may provide the streaming media content to the user device.

The streaming optimization server may assist a user device in obtaining streaming media content from a particular CDN that is capable of providing the streaming media content at a reduced latency, a reduced packet loss rate, etc. (e.g., as compared to another CDN). Additionally, or alternatively, the streaming optimization server may assist a CDN server in identifying particular host devices within a CDN that are capable of providing the streaming media content at a reduced latency, a reduced packet loss rate, etc. (e.g., as compared to other host devices within the CDN). In this way, a user device may receive streaming media content from a CDN and/or a host device that are associated with a particular performance.

Implementations described herein may conserve network resources by assisting a user device in obtaining streaming media content from a particular CDN and/or host device that are capable of providing the streaming media content (e.g., have available resources), thereby reducing latency, reducing a packet loss, increasing throughput, etc. Implementations described herein may assist a network device in estimating a network condition and may mitigate the effects of RAN delay in the network condition estimation process by measuring network performance without factoring in RAN measurements. Additionally, implementations described herein may reduce network congestion by directing streaming media content requests to CDNs and/or host devices that may have available resources to provide the streaming media content.

As indicated above, FIGS. 1A-1E are provided merely as an example. Other examples are possible and may differ from what was described with regard to FIGS. 1A-1E.

Figure 2:
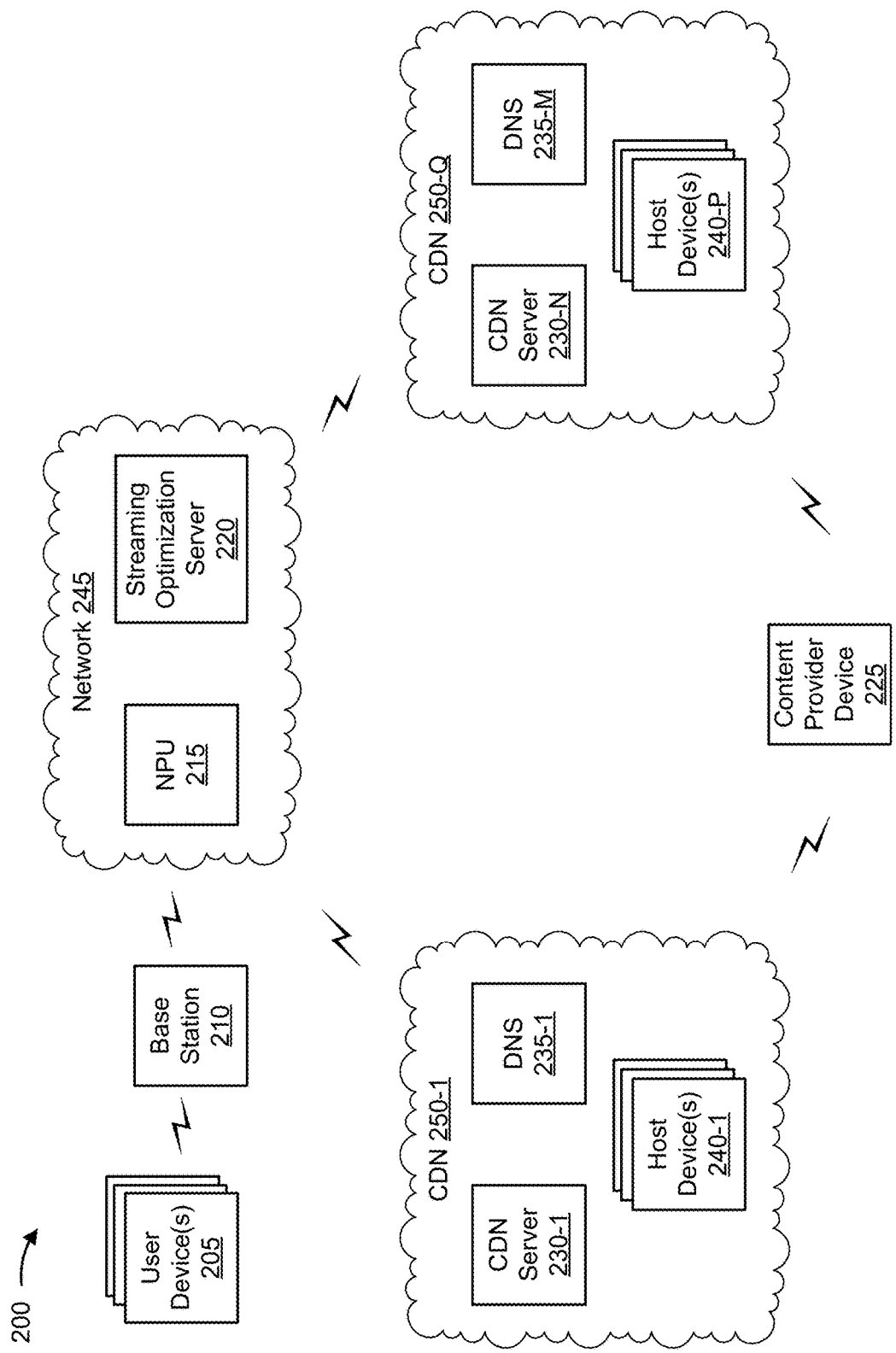
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 205 (hereinafter referred to collectively as "user devices 205," and individually as "user device 205"), a base station 210, a network processing unit (NPU) 215, a streaming optimization server 220, a content provider device 225, one or more CDN servers 230-1 through 230-N (N≥1) (hereinafter referred to collectively as "CDN servers 230," and individually as "CDN server 230"), one or more domain name servers (DNS) 235-1 through 230-M (M≥1) (hereinafter referred to collectively as "DNSs 235," and individually as "DNS 235"), one or more host devices 240-1 through 240-P (P≥1) (hereinafter referred to collectively as "host devices 240," and individually as "host device 240"), a network 245, and one or more content delivery networks (CDNs) 250-1 through 250-Q (Q≥1) (hereinafter referred to collectively as "CDNs 250," and individually as "CDN 250"). Devices of environment 200 may interconnect via wired connections, wireless connections, or a combination of wired and wireless connections.

User device 205 may include one or more devices capable of receiving, generating, storing, processing, and/or providing information associated with streaming media content. For example, user device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

User device 205 may request streaming media content by requesting segments of the media stream (e.g., using Hyper-Text Transfer Protocol (HTTP) Live Streaming (HLS), Dynamic Adaptive Streaming over HTTP (DASH), HTTP Dynamic Streaming, HTTP Adaptive Streaming, Microsoft Smooth Streaming, or the like). In some implementations, the request may be transmitted to host device 240. Host device 240 may respond to the request by providing the requested segments to user device 205, and user device 205 may process the received segments for playback.

Base station 210 may include one or more devices capable of transferring streaming media traffic, such as audio, video, and/or other traffic, destined for and/or received from user device 205. In some implementations, base station 210 may include an evolved Node B (eNB) associated with a long term evolution (LTE) network. Additionally, or alternatively, base station 210 may be associated with a radio access network (RAN) that is not associated with an LTE network. Base station 210 may send traffic to and/or receive traffic from user device 205 via an air interface. In some implementations, base station 210 may include a small cell base station, such as a base station of a microcell, a picocell, and/or a femtocell.

NPU 215 may include one or more devices capable of receiving, processing, storing, and/or transferring traffic associated with network 245. For example, NPU 215 may include a server, a gateway, a firewall, a router, or a similar device. In some implementations, NPU 215 may be included in network 245. In some implementations, NPU 215 may be included in base station 210 or may be combined with streaming optimization server 220. In some implementations, NPU 215 may provide information associated with network traffic to streaming optimization server 220. As used herein, traffic may refer to communication (e.g., via a packet) between two or more devices of environment 200. As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Streaming optimization server 220 may include one or more devices capable of receiving, storing, processing, and/or providing information associated with streaming media content. For example, streaming optimization server 220 may include a computing device, such as a server device or a similar device. In some implementations, streaming optimization server 220 may provide user device 205 with information regarding one or more CDNs 250. Additionally, or alternatively, streaming optimization server 220 may provide CDN server 230 and/or DNS 235 with information regarding one or more host devices 240.

Content provider device 225 may include one or more devices capable of receiving, processing, storing, and/or providing information associated with streaming media content. For example, content provider device 225 may include a computing device, such as a server (e.g., an application server, a host server, a web server, an HTTP server, etc.), a network device, or a similar device.

CDN server 230 may include one or more devices capable of receiving, storing, processing, and/or providing information associated with streaming media content. For example, CDN server 230 may include a computing device, such as a server device or a similar device. In some implementations, CDN server 230 may receive information identifying scores associated with host devices 240 and may provide an instruction to DNS 235 to update a resolution process based on the scores.

DNS 235 may include one or more devices capable of resolving a domain name into a network address (e.g., an IP address, or the like). For example, DNS 235 may include a server or a similar device. DNS 235 may receive information that identifies a domain name, and may provide information that identifies a network address mapped to the domain name (e.g., a network address of host device 240). DNS 235 may store a data structure that maps domain names to network addresses. In some implementations, DNS 235 may receive information from CDN server 230 identifying instructions for updating the data structure and/or updating a DNS resolution process. In some implementations, DNS 235 may resolve a network address request, from user device 205, with a network address of host device 240 that is located closest to a geographic location of user device 205. Additionally, or alternatively, DNS 235 may resolve a network address request with a network address of host device 240 based on receiving instructions from CDN server 230.

Host device 240 may include one or more devices capable of receiving, storing, processing, and/or providing streaming media content (e.g., one or more segments of streaming media content). For example, host device 240 may include a storage device, a server, or a similar device. Host device 240 may receive, from user device 205, requests for segments of the streaming media content. If a requested segment is stored by host device 240, then host device 240 may provide the requested segment to user device 205. If the requested segment is not stored by host device 240, then host device 240 may obtain the segment from content provider device 225 (e.g., by requesting and receiving the segment), may store the segment, and may provide the segment to user device 205.

Network 245 may include one or more wired and/or wireless networks. For example, network 245 may include a cellular network (e.g., an LTE network, a third generation (3G) network, a code division multiple access (CDMA) network, etc.), a public land mobile network (PLMN), a wireless local area network (e.g., a Wi-Fi network, etc.), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

CDN 250 may include one or more wired and/or wireless networks of devices that are capable of receiving, storing, processing, and/or providing streaming media content (e.g., one or more segments of the streaming media content). CDN 250 may include, for example, servers, data centers, or the like. In some implementations, CDN 250 may include host devices 240, DNS 235, and/or CDN server 230. One or more devices of CDN 250 may receive, from content provider device 225, streaming media content (e.g., one or more segments of a media stream) and may provide the streaming media content to user device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
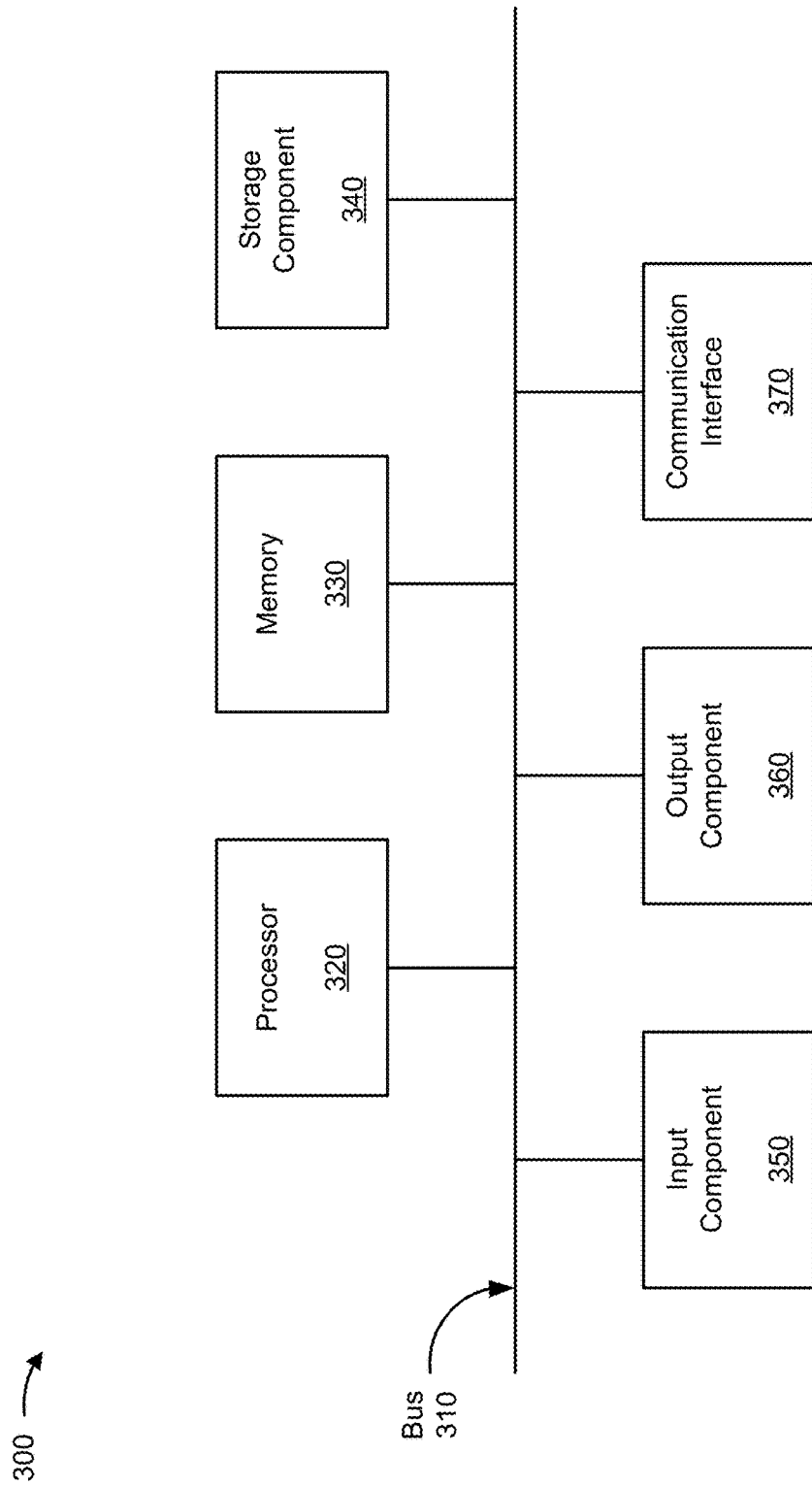
FIG. 3 is a diagram of example components of one or more devices of FIG. 2.

FIG. 3 is a diagram of example components of a device 300. Device 300 may correspond to user device 205, base station 210, NPU 215, streaming optimization server 220, content provider device 225, CDN server 230, DNS 235, and/or host device 240. In some implementations, user device 205, base station 210, NPU 215, streaming optimization server 220, content provider device 225, CDN server 230, DNS 235, and/or host device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining scores associated with content delivery networks. In some implementations, one or more process blocks of FIG. 4 may be performed by streaming optimization server 220. In some implementations, one or more process blocks of FIG. 4 may be performed by another device or a group of devices separate from or including streaming optimization server 220, such as user device 205, base station 210, NPU 215, content provider device 225, CDN server 230, DNS 235, and/or host device 240.

As shown in FIG. 4, process 400 may include receiving information, associated with streaming media traffic, associated with content delivery networks (block 410). For example, streaming optimization server 220 may receive information, associated with streaming media traffic, associated with CDNs 250. In some implementations, streaming optimization server 220 may receive the information from NPU 215. Additionally, or alternatively, streaming optimization server 220 may receive the information from user device 205.

As used herein, streaming media traffic may refer to communication (e.g., via a packet) between two or more devices (e.g., between user devices 205 and host devices 240, or the like). Further, streaming media content may be a video (e.g., live video, video on demand, or the like), audio (e.g., music, a podcast, an audiobook, or the like), or any other content which can be provided through a continuous flow of data.

In some implementations, streaming media content may be composed of multiple segments containing a part of the streaming media content. Each segment of the multiple segments may have a particular resource identifier. A resource identifier may be a string of characters used to identify a name or location of a resource in which such identification enables interactions with representations of the resource over a network. For example, a resource identifier may be a uniform resource identifier (URI), a uniform resource locator (URL), a uniform resource name (URN), or the like.

In some implementations, the streaming media content may be hosted on multiple CDNs 250 and/or on multiple host devices 240. Each CDN 250 and/or host device 240 may have some or all of the segments of media content for the streaming media content, and the segments may be associated with different resource identifiers that identify a location on a network (e.g., a particular host device 240, a particular CDN 250, etc.).

In some implementations, user device 205 may request one or more segments based on a manifest file. For example, a manifest file (e.g., an HLS manifest file, a DASH Media Presentation Description (MPD) file, etc.) may include information that identifies available segments and resource identifiers (e.g., URLs) for requesting segments associated with streaming media content. In some implementations, a manifest file may include resource identifiers associated with multiple CDNs 250. In some implementations, user device 205 may receive a manifest file from content provider device 225, CDN server 230, or the like.

In some implementations, user device 205 may request streaming media content by requesting segments of the streaming media content (e.g., using HLS, DASH, HTTP Dynamic Streaming, HTTP Adaptive Streaming, Microsoft Smooth Streaming, or the like). Based on the particular resource identifier (or resource identifiers) used by user device 205, a particular CDN 250 and/or host device 240 may provide the requested streaming media content to user device 205.

In some implementations, streaming optimization server 220 may receive information associated with CDNs 250. For example, streaming optimization server 220 may receive information associated with CDNs 250 that are providing streaming media content associated with content provider device 225. Additionally, or alternatively, streaming optimization server 220 may receive information associated with CDNs 250 that are providing streaming media content associated with content provider device 225 and/or another content provider device 225. In some implementations, streaming optimization server 220 may receive information associated with CDNs 250 based on an interval (e.g., every minute, every ten minutes, etc.). In some implementations, streaming optimization server 220 may receive information associated with CDNs 250 from NPU 215 and/or user device 205.

In some implementations, streaming optimization server 220 may receive information associated with one or more performance metrics associated with each CDN 250. For example, a performance metric may be measured by latency, jitter, bandwidth, throughput, packet loss, bit error rate, a quantity of cache hits, a quantity of cache misses, load, or the like. In some implementations, the one or more performance metrics may be associated with streaming media traffic associated with content provider device 225 (e.g., may be associated with a particular stream). Additionally, or alternatively, the one or more performance metrics may be associated with streaming media traffic associated with one or more content provider devices 225 (e.g., may be associated with multiple streams). Additionally, or alternatively, the one or more performance metrics may be associated with one or more user devices 205 that are requesting and/or receiving streaming media content.

In some implementations, the one or more performance metrics may be associated with a particular geographic location. For example, a geographic location may refer to latitude and longitude coordinates, a zip code, a city, a state, a region (e.g., east coast, midwest, etc.), a country, a continent, or the like. Additionally, or alternatively, a geographic location may refer to a location of a particular base station 210, a group of base stations 210, a cell, a group of cells, or the like.

In some implementations, streaming optimization server 220 may receive information that identifies a latency value associated with each CDN 250. For example, latency may include a quantity of time for a packet to travel between one or more devices and/or networks (e.g., NPU 215, CDN 250, user device 205, and/or base station 210). For example, NPU 215 may monitor streaming media traffic and may measure an overall latency (e.g., a quantity of time measured from a time that NPU 215 identifies a request from user device 205 to a time that NPU 215 identifies a segment of streaming media content associated with the request). Additionally, or alternatively, NPU 215 may measure a latency between NPU 215 and CDN 250 and/or host device 240. Additionally, or alternatively, NPU 215 may receive a latency value from user device 205 (e.g., user device 205 may measure an overall latency).

In some implementations, streaming optimization server 220 may receive information that identifies a jitter value associated with each CDN 250. For example, jitter may include a variation of the latency between two or more devices and/or networks (e.g., between NPU 215 and host device 240, etc.). Additionally, or alternatively, streaming optimization server 220 may receive information that identifies a bandwidth value associated with each CDN 250. For example, a bandwidth value may include a quantity of data per unit time (e.g., bits per second) that each CDN 250 is capable of providing (e.g., to user devices 205). Additionally, or alternatively, streaming optimization server 220 may receive information that identifies a throughput value associated with each CDN 250. For example, a throughput value may include a quantity of data per unit time (e.g., bits per second) that each CDN is providing (e.g., to user devices 205).

Additionally, or alternatively, streaming optimization server 220 may receive information that identifies a packet loss value associated with each CDN 250. For example, a packet loss value may include a quantity, a percentage, or the like, of packets sent from a particular CDN 250 that are not received by NPU 215 (e.g., identified by NPU 215) and/or user devices 250. Additionally, or alternatively, streaming optimization server 220 may receive information that identifies a bit error rate value associated with each CDN 250. For example, a bit error rate value may include a quantity, a percentage, or the like, of bit errors associated with a particular CDN 250.

Additionally, or alternatively, streaming optimization server 220 may receive information that identifies a cache hit value and/or a cache miss value associated with each CDN 250. For example, a cache hit value may include a quantity, a percentage, or the like, of requests (e.g., for a segment of streaming media content) that a particular CDN 250 serves (e.g., to user device 205) without contacting content provider device 225 for the requested streaming media content. Further, a cache miss value may include a quantity, a percentage, or the like, of requests that a particular CDN 250 serves based on contacting content provider device 225 for the streaming media content (e.g., the requested streaming media content).

In some implementations, NPU 215 may determine the one or more performance metrics (e.g., may measure the one or more performance metrics). Additionally, or alternatively, streaming optimization server 220 may determine the one or more performance metrics (e.g., may receive information from NPU 215 and/or user device 205 and may determine the one or more performance metrics based on the received information). Additionally, or alternatively, user device 205 may identify one or more of the performance metrics (e.g., user device 205 may provide one or more performance metrics to streaming optimization server 220).

In some implementations, streaming optimization server 220 may store the information (e.g., the one or more performance metrics) in a performance table based on receiving the information associated with CDNs 250. For example, the performance table (e.g., a data structure) may include one or more fields associated with the one or more performance metrics (e.g., a latency field, a jitter field, a packet loss field, etc.).

In some implementations, streaming optimization server 220 may store values associated with the one or more performance metrics. Additionally, or alternatively, streaming optimization server 220 may determine an average value (e.g., mean value, median value, etc.), a moving average value, a maximum value, a minimum value, or the like, based on receiving the one or more performance metrics. Additionally, streaming optimization server 220 may update the performance table based on receiving additional performance metrics associated with CDNs 250.

In some implementations, streaming optimization server 220 may include performance tables for one or more geographic locations. In this way, streaming optimization server 220 may receive information, associated with streaming media traffic, associated with CDNs 250 and may determine a score for each CDN 250, as described below.

As further shown in FIG. 4, process 400 may include determining scores associated with the content delivery networks (block 420). For example, streaming optimization server 220 may determine scores associated with CDNs 250. A score may include a value, a grade, a rank, a status, an indicator, or the like.

In some implementations, streaming optimization server 220 may determine a score based on one or more techniques (e.g., algorithms, machine learning, computational statistics, etc.). In some implementations, streaming optimization server 220 may determine a score based on one or more values stored in the performance table. For example, streaming optimization server 220 may determine a score based on all of the values in the performance table, based on a subset of the values in the performance table, by assigning particular weights to one or more values in the performance table, or the like.

In some implementations, the technique may receive information identifying known values, combinations of known values, etc., and known scores, and may correlate the known values with the known scores (e.g., using machine learning, computational statistics, or the like) to train a model. The model may then be used to determine scores for the content delivery networks based on one or more values in the performance table. In some implementations, streaming optimization server 220 may implement a technique to determine a score (e.g., by using one or more values from the performance table).

In some implementations, streaming optimization server 220 may determine a score associated with each CDN 250 (or a subset of CDNs 250), and may provide the scores to user device 205. In this way, streaming optimization server 220 and/or user device 205 may determine a particular CDN 250 from which user device 205 may request the streaming media content, as described below.

As further shown in FIG. 4, process 400 may include providing, to another device and based on the scores, information regarding one or more of the content delivery networks (block 430). For example, streaming optimization server 220 may provide the scores to user device 205. Additionally, or alternatively, streaming optimization server 220 may provide the scores to other devices (e.g., content provider device 225 and/or CDN servers 230). In some implementations, streaming optimization server 220 may provide, to user device 205, a message (e.g., a push notification, or the like) that includes the scores associated with CDNs 250. For example, streaming optimization server 220 may provide one or more messages based on an interval (e.g., every minute, ten minutes, etc.).

In some implementations, the message may include scores for each CDN 250, a subset of CDNs 250, etc. that is providing streaming media content to base station 210, base stations 210, and/or user devices 205 in a particular geographic location. For example, streaming optimization server 220 may receive information identifying a geographic location of user device 205, and may provide user device 205 with scores associated with the particular geographic location.

In some implementations, the message may include a CDN identifier, a list of CDN identifiers, or the like. For example, a CDN identifier may include a sequence of characters, digits, letters, values, etc. that may identify a particular CDN 250. In some implementations, the message may include one or more CDN identifiers, and may not include scores associated with CDNs 250. Additionally, or alternatively, the message may include CDN identifiers and scores associated with each CDN identifier (e.g., associated with CDNs 250 identified by the CDN identifiers).

In some implementations, the message may include a rank of each CDN 250 (e.g., a ranking of CDNs 250 based on the scores). Additionally, or alternatively, the message may include information identifying or inferring that a particular CDN 250 has a higher score than another CDN 250 (e.g., indicating that a particular CDN 250 may include better performance metrics than a CDN 250 from which user device 205 is receiving the streaming media content). For example, streaming optimization server 220 may compare scores associated with CDNs 250, and may determine that a particular score is the highest score, is higher than another score, or the like. Additionally, or alternatively, the message may include one or more performance metrics associated with CDNs 250.

In some implementations, the message may cause user device 205 to request streaming media content from a particular CDN 250 (e.g., access content using resource identifiers associated with the particular CDN 250). Additionally, or alternatively, the message may cause user device 205 to switch from using resource identifiers associated with a first CDN 250 to using resource identifiers associated with a second CDN 250 (e.g., based on a score of the second CDN 250 being higher than a score of the first CDN 250). For example, a higher score may indicate better performance metrics (e.g., less latency, less packet loss, more throughput, etc.) than a lower score.

In some implementations, the message may cause user device 205 to switch (e.g., using resource identifiers) based on a score associated with a particular CDN 250 (e.g., a CDN 250 from which user device 205 is receiving streaming media content) satisfying a threshold. Additionally, or alternatively, the message may cause user device 205 to switch based on a score associated with another CDN 250 (e.g., a CDN 250 from which user device 205 is not receiving streaming media content) satisfying a threshold. Additionally, or alternatively, the message may cause user device 205 to switch based on one or more performance metrics, associated with one or more CDNs 250, satisfying one or more thresholds. Additionally, or alternatively, the message may cause user device 205 to switch based on a score associated with a particular CDN 250 being higher than a score associated with another CDN 250. In some implementations, the message may cause user device 205 to switch based on a particular CDN identifier that is included in the message.

In some implementations, the message may permit user device 205 to request streaming media content from a particular CDN 250. Additionally, or alternatively, the message may permit user device 205 to switch from using resource identifiers associated with a first CDN 250 to using resource identifiers associated with a second CDN 250.

In some implementations, an application that is executing on user device 205 may receive information identifying the scores associated with CDNs 250. For example, the application may cause user device 205 to request streaming media content from a particular CDN 250 and/or to switch from using resource identifiers associated with a first CDN 250 to using resource identifiers associated with a second CDN 250.

In some implementations, user device 205 may request content using resource identifiers associated with a particular CDN 250 based on receiving the message and/or the one or more scores from streaming optimization server 220. For example, user device 205 may identify resource identifiers associated with a particular CDN 250 in a manifest file (e.g., a manifest file that is stored by user device 205). Additionally, or alternatively, user device 205 may request a manifest file (e.g., including resource identifiers associated with a particular CDN 250) from another device (e.g., content provider device 225, CDN server 230, or the like). Additionally, or alternatively, user device 205 may update a manifest file based on receiving resource identifiers associated with a particular CDN 250 and may access the streaming media content using the received resource identifiers.

In this way, user device 205 may receive information (e.g., scores, performance metrics, CDN identifiers, etc.) associated with multiple CDNs 250 and may request streaming media content from a particular CDN 250 based on the information. Implementations described herein may conserve network resources by assisting user device 205 to request streaming media content from a particular CDN 250 that may be capable of providing the streaming media content at a reduced latency, minimizing packet loss, or the like, thereby reducing network congestion. Additionally, implementations described herein may mitigate the effects of RAN delay when estimating network conditions, thereby allowing user device 205 to select a particular CDN 250 based on more accurate network conditions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for determining scores associated with host devices within a content delivery network. In some implementations, one or more process blocks of FIG. 5 may be performed by streaming optimization server 220. In some implementations, one or more process blocks of FIG. 5 may be performed by another device or a group of devices separate from or including streaming optimization server 220, such as user device 205, base station 210, NPU 215, content provider device 225, CDN server 230, DNS 235, and/or host device 240.

In some implementations, streaming optimization server 220 may determine scores associated with host devices 240 within a particular CDN 250 based on determining scores associated with CDNs 250 (e.g., may determine scores associated with host devices 240 within a particular CDN 250 having a highest score, determine scores associated with host devices 240 for each CDN 250, or the like). Alternatively, streaming optimization server 220 may determine scores associated with host devices 240 within a particular CDN 250 (or for multiple CDNs 250) without having determined scores associated with CDNs 250. Alternatively, streaming optimization server 220 may determine scores associated with CDNs 250 based on determining scores associated with host devices 240 within CDNs 250. Alternatively, streaming optimization server 220 may determine scores associated with CDNs 250 without determining scores associated with host devices 240 within CDNs 250.

As shown in FIG. 5, process 500 may include receiving information, associated with streaming media traffic, associated with host devices within a content delivery network (block 510). For example, streaming optimization server 220 may receive information, associated with streaming media traffic, associated with host devices 240 within CDN 250.

As described above in connection with FIG. 4, user device 205 may request streaming media content by requesting segments of the streaming media using resource identifiers (e.g., URLs). Based on the particular resource identifier (or resource identifiers) used by user device 250, a particular CDN 250 and/or host device 240 may provide the requested streaming media content to user device 205. For example, a resource identifier (e.g., a URL) may be associated with a particular CDN 250.

Further, DNS 235 may resolve a host name associated with a resource identifier to a network address (e.g., an IP address) associated with a particular host device 240 within a particular CDN 250. For example, DNS 235 may store a data structure (e.g., a lookup table, etc.) that maps host names to network addresses. A particular host device 240 may provide the streaming media content to user device 205 based on the resource identifier used by user device 205. In some implementations, DNS 235 may receive information identifying a geographic location of user device 205, and may resolve a host name to a network address associated with a particular host device 240 that is located closest to user device 205.

In some implementations, streaming optimization server 220 may receive information, associated with streaming media traffic, associated with host devices 240 in a similar fashion as described above in connection with FIG. 4. For example, NPU 215 may monitor streaming media traffic and may provide, to streaming optimization server 220, information (e.g., performance metric values, etc.) associated with host devices 240. For example, NPU 215 may measure one or more performance metrics (e.g., latency, jitter, bandwidth, throughput, packet loss, bit error rate, a quantity of cache hits, a quantity of cache misses, load, or the like) associated with host devices 240 and may provide information identifying one or more performance metric values to streaming optimization server 220. In some implementations, the one or more performance metric values may be associated with a particular geographic location.

In some implementations, streaming optimization server 220 may receive performance metric values associated with host devices 240 and may store values associated with the performance metric values in a performance table. In this way, streaming optimization server 220 may receive information, associated with streaming media traffic, associated with host devices 240 and may determine a score for each host device 240, as described below.

As further shown in FIG. 5, process 500 may include determining scores associated with the host devices (block 520). For example, streaming optimization server 220 may determine scores associated with host devices 240 within a particular CDN 250. In some implementations, streaming optimization server 220 may determine scores associated with host devices 240 in a similar manner as described above in connection with FIG. 4 (e.g., based on one or more techniques, such as algorithms, machine learning, computational statistics, etc.).

In some implementations, streaming optimization server 220 may provide the scores associated with host devices to CDN server 230. In this way, CDN server 230 and/or DNS 235 may route requests from user device 205 to particular host devices 240, as described below.

As further shown in FIG. 5, process 500 may include providing, to another device and based on the scores, information regarding one or more of the host devices (block 530). For example, streaming optimization server 220 may provide the scores associated with host devices 240 to CDN server 230. Similar to that described above in connection with FIG. 4, streaming optimization server 220 may provide, to CDN server 230, a message (e.g., a push notification) that includes the scores associated with host devices 240. In some implementations, the message may include a rank of each host device 240, information identifying that a particular host device 240 includes a higher score than another host device 240, one or more host identifiers (e.g., sequences of digits, values, characters, letters, etc. that may identify host devices 240), or the like.

In some implementations, CDN server 230 may provide an instruction to DNS 235 to update a DNS resolution process based on the scores associated with host devices 240. For example, CDN server 230 may instruct DNS 235 to resolve a host name included in a resource identifier to a network address associated with a particular host device 240 (or host devices 240). For example, based on receiving scores associated with host devices 240, CDN server 230 may identify a particular host device 240 (or host devices 240) that is capable of providing streaming media content to a particular geographic location (e.g., capable of minimizing latency, reducing packet loss, etc.).

In some implementations, DNS 235 may receive the instruction from CDN server 230 and may update a data structure to map host names to a particular host device 240 or host devices 240. In this way, DNS 235 may receive a host name (e.g., based on a request for streaming media content by user device 205), and may resolve the host name to a network address associated with a particular host device 240 (e.g., a particular host device 240 having a particular score, a particular host device 240 having a higher score than another host device 240, etc.).

In some implementations, DNS 235 may receive information identifying a geographic location of user device 205 that is requesting streaming media content (e.g., user device 205 may provide information identifying a location of user device 205 to DNS 235). DNS 235 may resolve a host name included in the request (e.g., based on a resource identifier) to a network address associated with a particular host device 240 (e.g., based on an instruction from CDN server 230). Additionally, or alternatively, DNS 235 may resolve a host name to a network address based on information received from CDN server 230 and based on another factor (e.g., a geographic distance of user device 205 from host device 240, or the like).

In this way, CDN server 230 may receive information regarding one or more host devices 240 (e.g., scores, performance metrics, host device identifiers, etc.) from streaming optimization server 220 and may provide an instruction to DNS 235 to update a resolution process (e.g., map host names to particular network addresses). Implementations described herein may conserve network resources by assisting user device 205 to request streaming media content from host device 240 that is capable of delivering the streaming media content (e.g., by reducing latency, by reducing a quantity of dropped packets, or the like).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may conserve user device processor and/or memory resources and may conserve network resources by assisting a user device in requesting streaming media content from a content delivery network and/or a host device that are capable of providing the streaming media content by reducing latency, reducing jitter, reducing a quantity of dropped packets, or the like. Additionally, implementations described herein may assist a network device in monitoring traffic associated with streaming media content and determining particular CDNs and/or host devices to provide streaming media content to user devices. In this way, network congestion may be reduced based on routing requests to particular CDNs and/or host devices that are capable of providing the streaming media content at reduced latencies, recued packet loss rates, etc.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   determine a geographic location of a user device;
   receive information associated with media content for a subset of content delivery networks, from a plurality of content delivery networks,
   the subset of content delivery networks being associated with the geographic location,
   the subset of content delivery networks including a first content delivery network and a second content delivery network,
   the first content delivery network and the second content delivery network being capable of providing the media content,
   the second content delivery network including a first host device and a second host device, and
   the information including a plurality of first performance metrics associated with the first content delivery network and a plurality of second performance metrics associated with the second content delivery network;
   determine a first score associated with the first content delivery network based on at least two first performance metrics, of the plurality of first performance metrics, associated with the first content delivery network;
   determine a second score associated with the second content delivery network based on at least two second performance metrics, of the plurality of second performance metrics associated with the second content delivery network;
   provide, based on the first score and the second score, a message, including a rank of each of the first content delivery network and the second content delivery network, to the user device to cause the user device to switch from using resource identifiers, in a first manifest file, associated with multiple segments of the media content from the first content delivery network to using resource identifiers, in a second manifest file, associated with multiple segments of the media content from the second content delivery network,
   the message to cause the user device to switch based on the second score associated with the second content delivery network satisfying a threshold;
   receive information associated with the first host device and the second host device based on the user device switching to the second content delivery network;
   determine a third score associated with the first host device;
   determine a fourth score associated with the second host device; and
   provide, based on the third score and the fourth score, information to update a data structure based on a rank of each of the first host device and the second host device,
   the information to cause a network device to route requests for the media content to a different host device based on the updated data structure.

2. The device of claim 1, wherein the plurality of first performance metrics includes at least two of:
   a latency value,
   a jitter value, or
   a bandwidth value.

3. The device of claim 1, where the one or more processors are further to:
compare the first score and the second score; and
where the one or more processors, when providing the message to the user device, are to:
provide the message based on comparing the first score and the second score.

4. The device of claim 1, where the geographic location includes at least one of:
a location of a base station,
a location of a cell,
a location of a city, or
a region.

5. The device of claim 1, where the one or more processors are further to:
compare the third score and the fourth score; and
where the one or more processors, when providing the information regarding the first host device to the network device, are to:
provide the information regarding the first host device based on comparing the third score and the fourth score.

6. The device of claim 1, where the third score is based on a reduced packet loss rate associated with the first host device, and
where the fourth score is based on a reduced packet loss rate associated with the second host device.

7. The device of claim 1, where the plurality of first performance metrics and the plurality of second performance metrics are associated with streaming media traffic associated with a plurality of content provider devices.

8. A non-transitory computer-readable medium storing instructions, the instructions comprising:
one or more instructions that, when executed by one or more processors of a device, cause the one or more processors to:
determine a geographic location of a user device;
receive information associated with media content for a subset of content delivery networks, from a plurality of content delivery networks,
the subset of content delivery networks being associated with the geographic location,
the subset of content delivery networks including a first content delivery network and a second content delivery network,
the first content delivery network and the second content delivery network being capable of providing the media content,
the second content delivery network including a first host device and a second host device, and
the information including a plurality of first performance metrics associated with the first content delivery network and a plurality of second performance metrics associated with the second content delivery network;
determine a first score associated with the first content delivery network based on two or more of the first performance metrics of the plurality of first performance metrics associated with the first content delivery network;
determine a second score associated with the second content delivery network based on two or more of the first performance metrics of the plurality of second performance metrics associated with the second content delivery network;
provide, based on the first score and the second score, a message, including a rank of each of the first content delivery network and the second content delivery network, to the user device to cause the user device to switch from using resource identifiers, in a first manifest file, associated with multiple segments of the media content from the first content delivery network to using resource identifiers, in a second manifest file, associated with multiple segments of the media content from the second content delivery network,
the message to cause the user device to switch based on the second score associated with the second content delivery network satisfying a threshold;
receive information associated with the first host device and the second host device based on the user device switching to the second content delivery network;
determine a third score associated with the first host device;
determine a fourth score associated with the second host device; and
provide, based on the third score and the fourth score, information to update a data structure based on a rank of each of the first host device and the second host device,
the information to cause a network device to route requests for the media content to a different host device based on the updated data structure.

9. The non-transitory computer-readable medium of claim 8, where the one or more instructions, that cause the one or more processors to provide the message to the user device, cause the one or more processors to:
provide the message to the user device based on the user device being located in the geographic location.

10. The non-transitory computer-readable medium of claim 8, where the plurality of first performance metrics or the plurality of second performance metrics include at least two of:
a latency value,
a jitter value,
a packet loss value,
a bit error rate value,
a bandwidth value, or
a throughput value.

11. The non-transitory computer-readable medium of claim 8, where the media content is associated with streaming media traffic.

12. The non-transitory computer-readable medium of claim 8, where the geographic location includes at least one of:
a location of a base station,
a location of a cell,
a location of a city, or
a region.

13. The non-transitory computer-readable medium of claim 8, where the third score is based on a reduced packet loss rate associated with the first host device, and
where the fourth score is based on a reduced packet loss rate associated with the second host device.

14. The non-transitory computer-readable medium of claim 8, where the plurality of first performance metrics and the plurality of second performance metrics are associated with streaming media traffic associated with a plurality of content provider devices.

15. A method, comprising:
determining, by a device, a geographic location of a user device;

receiving, by the device, information associated with media content, for a subset of content delivery networks, from a plurality of content delivery networks,
the subset of content delivery networks being associated with the geographic location,
the subset of content delivery networks including a first content delivery network and a second content delivery network,
the first content delivery network, the second content delivery network, a first host device, and a second host device being capable of providing the media content,
the first host device and the second host device being included in the second content delivery network, and
the information including a plurality of first performance metrics associated with the first host device and a plurality of second performance metrics associated with the second host device;
determining, by the device, a first score associated with the first content delivery network based on two or more of the first performance metrics of the plurality of first performance metrics associated with the first content delivery network;
determining, by the device, a second score associated with the second content delivery network based on two or more of the second performance metrics of the plurality of second performance metrics associated with the second content delivery network;
providing, by the device, based on the first score and the second score, a message, including a rank of each of the first content delivery network and the second content delivery network, to the user device to cause the user device to switch from using resource identifiers, in a first manifest file, associated with multiple segments of the media content from the first content delivery network to using resource identifiers, in a second manifest file, associated with multiple segments of the media content from the second content delivery network,
the message to cause the user device to switch based on the second score associated with the second content delivery network satisfying a threshold;
receive information associated with the first host device and the second host device based on the user device switching to the second content delivery network;
determining, by the device, a third score associated with the first host device based on the plurality of first performance metrics;
determining, by the device, a fourth score associated with the second host device based on the plurality of second performance metrics; and
providing, based on the third score and the fourth score, information to update a data structure based on a rank of each of the first host device and the second host device,
the information to cause a network device to route requests for the media content to a different host device based on the updated data structure.

16. The method of claim 15, where the media content is associated with streaming media traffic.

17. The method of claim 15, further comprising:
comparing the first score and the second score; and
where providing the message comprises:
providing the message based on comparing the first score and the second score.

18. The method of claim 15, where the plurality of first performance metrics or the plurality of second performance metrics include at least two of:
a latency value,
a jitter value,
a packet loss value,
a bit error rate value,
a bandwidth value, or
a throughput value.

19. The method of claim 15, where the information associated with media content does not include information associated with delivering the media content from a base station to the user device.

20. The method of claim 15, where the geographic location includes at least one of:
a location of a base station,
a location of a cell,
a location of a city, or
a region.

* * * * *